Dec. 27, 1960
T. I. PROKOPOWICZ ET AL
2,966,420
CERAMIC DIELECTRIC PROCESS
Filed May 3, 1957
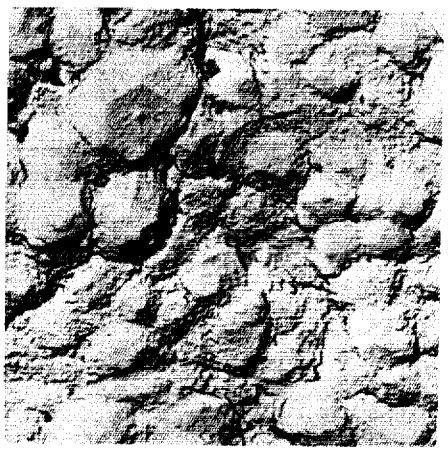
Inventors
THOMAS I. PROKOPOWICZ
DANIEL R. NORTON
FIELDING BROWN
By Connolly and Hutz
Attorneys

2,966,420
CERAMIC DIELECTRIC PROCESS

Thomas I. Prokopowicz, North Adams, and Daniel R. Norton and Fielding Brown, Williamstown, Mass., assignors to Sprague Electric Company, North Adams, Mass., a corporation of Massachusetts Filed May 3, 1957, Ser. No. 656,799

2 Claims. (Cl. 106—39)

This invention relates to ceramic dielectric bodies, and particularly to a process for producing fired ceramic bodies of high dielectric constant.

Among the objects of the present invention is the provision of novel dielectrics of the above type which are of unusual effectiveness for electrical devices and more particularly as dielectrics for electrical capacitors. Further objects of the present invention include the provision of novel methods for making these dielectrics.

The above as well as additional objects of the present invention will be more clearly understood from the following description of several of its exemplifications, reference being made to the accompanying drawing wherein the single figure is a reproduction of an electron photomicrograph of a dielectric representative of the invention.

According to the present invention, a high dielectric constant ceramic that meets commercial standards is very simply prepared in a highly reproducible manner by firing a mixture of particles of chemically pure barium titanate with 4 to 9 mole percent $TiO_2$ and 0 to 0.5 mole percent NiO, at temperature of 1275 to 1320° C. for from one to four hours, substantially all of the particles being less than 2 microns in size.

It has been discovered that the above process provides a sintered mass which is essentially barium titanate having substantially all grains less than 2 microns in size. In addition, the grain boundaries appear to be surrounded by a second phase formed by the precipitation of barium dititanate ($BaO \cdot 2TiO_2$) at the grain boundaries, and the entire mass has a porosity of not more than 2 percent. This porosity is measured by taking the percentage difference between the theoretical density of $BaTiO_3$ plus the second phase and the measured bulk density of the sample as determined by macroscopic weight and volume measurements. Conventional sintered barium titanate bodies have porosities which run to more than 5 percent when measured according to this technique. The low porosity of the body is achieved by the precipitate (density of about 4.4 grams per cubic centimeter) partially filling the pores of the metatitanate (density of about 5.9 grams per cubic centimeter).

We have discovered that a very pure barium titanate is necessary to provide consistently reproducible results. A grade of barium titanate suitable for our purposes is chemically pure $BaTiO_3$, which has less than 0.05% silica ($SiO_2$), less than 0.05% alumina ($Al_2O_3$), less than 0.05% phosphorous pentoxide ($P_2O_5$), and less than 0.1% sodium oxide ($Na_2O$). When these impurities are present in amounts greater than the above recited limits, formation of the second phase is inhibited and grain growth is promoted. The use of high purity $BaTiO_3$ as our starting raw material provides relatively few vacancies in the lattice of the crystallites, so that in our addition of excess titania the added $TiO_2$ tends not to diffuse freely, but tends to react only with the surface layers of the grains.

Our discovery of the superior product which can be obtained by the addition of excess titania has included a determination that the applicable workable range of addition is from 4 to 9 percent. The addition of less than 4 mole percent of titania does not provide sufficient formation of the second phase of barium dititanate, because small amounts of $TiO_2$ go into solid solution with the $BaTiO_3$ and are thus not available for formation of the second phase. While this second phase is extremely useful in keeping the grain growth of the first phase under control, it should be noted that too much second phase defeats our purpose of producing a body of high dielectric constant by actually reducing the dielectric constant, because barium dititanate has only about one-tenth the dielectric constant of barium titanate. Hence the need for keeping the amount of excess titania below the upper limit of 9 mole percent has been established.

The following specific examples illustrate preferred operating steps for the new process:

Example I 100 grams of chemically pure barium titanate, in which the ratio of BaO to $TiO_2$ is in agreement with the stoichiometric formula and in which none of the impurities listed above are present in excess of the limits set forth, is mixed with 1.6 grams of chemically pure titanium dioxide having an analysis of 99.0–100.0% $TiO_2$ and 150 cc. of distilled water, and the mixture is milled in a porcelain mill ¼ filled with porcelain balls until an intimate mixture is obtained. It is important in this mixture that the ball milling be limited to the extent necessary to permit the mixing function to be fulfilled, while ensuring that the mixture is not contaminated by the ball material. It has been found that ball milling for about four hours satisfies both of these conditions. It has been discovered that the material produced from the constituents of the above-recited purity and according to the above-recited techniques is composed of particles which are essentially all one micron or smaller in size. The milled mixture is removed from the mill, permitted to settle, and the supernatant water drawn off. To the remaining slurry is added 60 milliliters of a binder solution of 5% methylcellulose, and the resulting mixture is then dried in an oven at 100° C. for approximately 3 to 4 hours, the dried product is then broken up and sieved to 300 to 100 mesh.

The dried powder is pressed into discs 10 mils thick and 1 inch in diameter under a pressure of 5 tons per square inch and the discs placed on zirconia plates and fired in a normal or air atmosphere in an electrically heated kiln having an internal temperature of 1305° C. A one hour preheating is carried out by moving the discs slowly through a cooler part of the oven. The discs are then subjected to the peak oven temperature for two hours. The discs are then cooled at the rate of about 20° C. per minute, and are immediately ready for use.

When coated on their opposing faces with capacitor grade silver paint that is fired on at between 1200 and 1400° F., they show the following characteristics:

| | |
|---|---|
| Dielectric constant at 1 kilocycle and 25° C. | 3000 to 3100. |
| Electric field effect on dielectric constant | Minus 28% at 50 volts per mil. |
| Temperature coefficient of dielectric constant | Minus 29.5% at −55° C. plus 3% at 85° C. |
| Dissipation factor | 1.1% at 1 kilocycle; 2.5% at 300 kilocycles. |
| Aging rate | 1.5% per decade up to 200 hours. |
| Frequency dependence of dielectric constant | Minus 7% at 300 kilocycles. |
| Ultimate breakdown | 175 volts per mil. |
| 85° C. rating | 100 volts per mil. |
| Porosity | 1.6%. |
| Grain size | Substantially all grains less than 1 micron. |

The discs can be used to make capacitors such as those described in U.S. Patent 2,777,110 granted January 8, 1957, or in simple capacitors having a single electrode on each face, or in printed circuit constructions in which resistive coatings may be combined with electrode coatings, as in U.S. Patent 2,637,778 granted May 5, 1953. The ceramic bodies can be made in the form of squares or rectangles in place of discs, in the manner shown for example, in U.S. Patent 2,665,376 granted January 5, 1954. The thickness of the ceramic can range from as little as is needed to permit handling, generally at least about 6 to 8 mils to as much as ½ inch or more, as in the so-called slug capacitors for use in potentials of about 20,000 volts. Such slug capacitors are described in U.S. Patent 2,836,777 issued May 27, 1958. The ceramics can also be used at temperatures as low as −65° C., or even lower, and at temperatures as high as +100° C.

*Example II*

100 grams of the barium titanate of Example I is mixed with 1.8 grams of the titanium dioxide of Example I, 0.2 gram of NiO having an analysis of 99.0–100.0% NiO and 150 cc. of water. This mixture is treated exactly as in Example I except that the firing temperature is reduced to 1295° C. The resulting ceramic bodies show about the same characteristics as those in Example I, the principal distinction being that the dissipation factor at 1 kilocycle is reduced to 0.8%. These bodies can be used in the same manner as those of Example I. Without the NiO the formulation of Example II produces bodies that are electrically not distinguishable from those produced by Example I.

Any chemically pure grade of barium titanate, $TiO_2$ and NiO can be used in accordance with the present invention. Materials that react to provide the same formulation can also be used. However, where such reaction is accompanied by the liberation of volatile by-products, the resulting material has somewhat higher content of non-volatile impurities, and exceptionally pure starting materials are then desirable.

Nickel compounds other than nickel oxide can be used if the compounds will decompose to any of the nickel oxides during the sintering or preheating. Nickel nitrate, nickel carbonate, nickel ammonium sulfate and nickel acetate are examples of suitable nickel compounds.

The milling should be carried out in such a way as not to produce any appreciable amounts of impurities. Porcelain or alumina milling surfaces are suitable, and these surfaces can also be made of barium titanate itself.

The firing temperature is quite critical. Below 1275° C. or above 1320° C. the product is not uniform and the desired phase separation is not obtained. Firing above 1320° C. causes the second phase to melt and drain from the product. The molten material further promotes grain growth, which is the antithesis of our addition of titania. Firing below the lower limit of the range results in bodies which are quite porous and are poor electrically. Best results are provided by firing between 1275 and 1320° C., with the lower portion of this range, that is 1275 to 1300° C., being preferred for formulations that include nickel oxide and the upper portions, 1290 to 1320° C. for nickel-free compositions.

We have discovered that the dielectric constant of these excess titania bodies can be increased by approximately 5 to 10 percent by annealing the bodies at a temperature slightly below 1200° C. for from one to three hours. The bodies prepared and fired as set forth in Examples I and II may be annealed without removal from the firing oven by permitting the oven temperature to drop to 1150° C., and then holding the bodies at that temperature for two hours. This annealing resulted in an increase in the dielectric constant of 8 percent for both bodies.

The addition of nickel oxide results in a linear reduction in dissipation factor, as well as a slight lowering of the firing range. The addition of up to 0.5 mole percent of NiO reduces the dissipation factor by about 30 percent, with respect to our excess titania body without NiO. It should be noted that an addition of more than 0.5 mole percent of NiO results in the formation of a second phase of nickel titanate $NiTiO_3$ which causes the bodies to fire poorly with a resultant porous structure.

When prepared for firing, the formulations of the present invention can have their particles held together with any kind of a binder, preferably one that is completely volatilized during the firing. Instead of the methyl cellulose referred to in the above examples, carboxy methyl cellulose, polyvinyl alcohol, or even ordinary rosin, are suitable. The binders can either be added to the milling mixture, or they can be mixed with the dried material immediately before pressing. The water used as a vehicle for milling can also be replaced by methyl alcohol, ethyl alcohol, or other organic liquids, and even mixtures of either of the above alcohols with water are suitable.

The firing of any substantial number of particles larger than 2 microns in size gives erratic results. Furthermore, the sintered masses made from the coarser particles do not have the fine grain size, nor do they have the low porosity of those made in accordance with the invention.

A feature of the present invention is that it provides relatively high dielectric constant bodies which show a fairly uniform dielectric constant over the normal temperature range and which otherwise lend themselves very well to commercial operations. A still further feature of this invention is that our dielectric may be given a higher voltage rating than prior art material having comparable dielectric constants. The dielectric of this invention may be rated at 100 volts per mil as compared with 50 to 60 volts per mil for comparable dielectric constant bodies. This higher voltage rating is attributable to the extremely low porosity achieved in accordance with this invention. Also attributable to this low porosity are the superior breakdown and life characteristics exhibited by this body. Although higher dielectric constants have been described in the prior art, they are associated with very critical operating temperature ranges, high losses, non-uniformity, or other undesirable characteristics. Over the entire formulation range given above, about the same dielectric constant and other properties are obtained in accordance with the invention. In each case the nickel oxide additions give less losses and make somewhat lower firing temperatures preferable.

The single figure of the drawing is a photomicrograph of a barium titanate body having excess titania and produced according to this invention. The magnification of 21,800× clearly discloses the extremely small grain size, and the uniformity of particle size. The figure provides a further understanding of our product by an unusually clear showing of the second phase ($BaO \cdot 2TiO_2$) surrounding the grains. This second phase is shown as the bumpy granular surface on the larger particles.

Obviously many modifications and variations of the present invention are possible in the light of the above teachings. It is, therefore, to be understood that within the scope of the appended claims the invention may be practiced otherwise than as specifically described.

What is claimed is:

1. A process for producing high dielectric constant ceramic bodies, said process being characterized by the steps of mixing excess titania in the range of four to nine mole percent with chemically pure stoichiometric barium titanate having grain size of approximately one micron and substantially all grains less than two microns, pressing the mixture into bodies for firing, and then sintering the bodies in an air atmosphere in a temperature range of 1275° C. to 1320° C. for from one to four hours, whereby the sintered bodies exhibit a porosity of not more than two percent.

2. The process of claim 1 wherein the sintered bodies are then annealed at a temperature between about 1150° C. and about 1200° C. for one to three hours.

References Cited in the file of this patent

UNITED STATES PATENTS

| 2,429,588 | Thurnauer et al. | Oct. 21, 1947 |
| 2,434,079 | Nutting | Jan. 6, 1948 |
| 2,576,380 | Woodcock et al. | Nov. 27, 1951 |
| 2,643,192 | Jonker et al. | June 23, 1953 |
| 2,695,239 | Oshry | Nov. 23, 1954 |

OTHER REFERENCES

Anliker et al.: Helvetica Physics Acta, vol. 25, fasc. 5, Sept. 15, 1942 (pp. 474–475).

Egerton et al.: J. Amer. Cer. Soc., vol. 38, November 1955 (pp. 412–418).

Rase et al.: J. Amer. Ceramic Soc., March 1955, vol. 38 (pp. 102–113).